(12) United States Patent
Nakano

(10) Patent No.: US 9,097,883 B2
(45) Date of Patent: Aug. 4, 2015

(54) CATADIOPTRIC OPTICAL SYSTEM AND IMAGE-PICKUP APPARATUS HAVING THE SAME

(75) Inventor: Masatsugu Nakano, Tucson, AZ (US)

(73) Assignee: CANON KABUSHIKI KAISHA (JP)

( * ) Notice: Subject to any disclaimer, the term of this patent is extended or adjusted under 35 U.S.C. 154(b) by 680 days.

(21) Appl. No.: 13/353,385

(22) Filed: Jan. 19, 2012

(65) Prior Publication Data

US 2012/0182414 A1    Jul. 19, 2012

(30) Foreign Application Priority Data

Jan. 19, 2011    (JP) ................. 2011-008370

(51) Int. Cl.
| | |
|---|---|
| G02B 17/00 | (2006.01) |
| G02B 13/18 | (2006.01) |
| G02B 17/08 | (2006.01) |
| G02B 27/00 | (2006.01) |
| G02B 21/04 | (2006.01) |

(52) U.S. Cl.
CPC ............ *G02B 13/18* (2013.01); *G02B 17/0808* (2013.01); *G02B 21/04* (2013.01); *G02B 27/005* (2013.01)

(58) Field of Classification Search
CPC .. G02B 21/365; G02B 21/367; G02B 21/002; H04N 7/18; G01N 21/6458
USPC .......................................................... 348/79
See application file for complete search history.

(56) References Cited

U.S. PATENT DOCUMENTS

| | | | | |
|---|---|---|---|---|
| 5,212,593 | A * | 5/1993 | Williamson et al. ...... | 359/485.07 |
| 2005/0259318 | A1* | 11/2005 | Armstrong et al. ........... | 359/350 |
| 2006/0256451 | A1* | 11/2006 | Schaack ........................ | 359/741 |

FOREIGN PATENT DOCUMENTS

| | | |
|---|---|---|
| JP | 53-112759 | 10/1978 |
| JP | 60-34737 U | 3/1985 |
| JP | 2007-514179 A | 5/2007 |
| WO | 00/39623 A1 | 7/2000 |
| WO | 2005/022204 A2 | 10/2005 |

* cited by examiner

*Primary Examiner* — Jay Au Patel
*Assistant Examiner* — Frank Huang
(74) *Attorney, Agent, or Firm* — Rossi, Kimms & McDowell LLP

(57) ABSTRACT

A catadioptric optical system includes a first imaging optical system including a catadioptric part configured to condense a light flux from an object and to form an intermediate image of the object, and a second imaging optical system including a dioptric part configured to form an image of the intermediate image on an image surface. The light flux from the object passes through the light transmission part of the first optical element, the negative lens, the backside reflection part of the second optical element, the negative lens, the backside reflection part of the first optical element, the negative lens, and the light transmission part of the second optical element, in this order, and is emitted to the second imaging optical system. An Abbe number of a material of the negative lens is larger than that of a material of the second optical element.

5 Claims, 7 Drawing Sheets

CATADIOPTRIC OPTICAL SYSTEM AND IMAGE-PICKUP APPARATUS HAVING THE SAME

BACKGROUND OF THE INVENTION

1. Field of the Invention

The present invention relates to a catadioptric optical system which is suitable for enlarging a sample (object) for observations, and an image pickup apparatus having the same.

2. Description of the Related Art

In the present pathological examination, a pathological sample is directly observed with a human eye using an optical microscope. In recent years, a so-called virtual microscope is used, which captures a pathological sample as image data and enables it to be observed on a display. Since the virtual microscope enables the image data of the pathological sample to be observed on the display, a plurality of people can observe it at the same time. Moreover, this virtual microscope has many advantages: For example a diagnosis can be requested by sharing the image data with a distant pathologist. A traditional virtual microscope, however, needs a long time to take an image of a pathological sample and to capture its image data.

One time-consuming factor is a narrow image-pickup area of a microscope used to capture a wide image-pickup range of a pathological sample as image data. It is necessary for the narrow image-pickup area of the microscope to take images multiple times or through scanning and to synthesize them into one image. Therefore, an (image-pickup) optical system having a wide image-pickup area is required in order to make the number of shots smaller and to make an image capturing time period shorter.

Along with the wide image-pickup area, an optical system having a high resolution in a visible range (wide wavelength region) is also required. The optical system having a high resolution is required not only for use in pathological diagnosis but also for various fields.

Japanese Patent Publication No. S60-034737 discloses an objective lens of a microscope which includes a dioptric optical system that reduces aberrations well in the entire visible light range, and is suitable for observing a biologic cell or anything.

Japanese Domestic Publication No. 2007-514179 discloses an ultra-broadband ultraviolet microscope video system having a high resolution in an ultraviolet wide wavelength range using a catadioptric imaging optical system to detect defects in an integrated circuit or a photomask. WO00/039623 discloses a catadioptric optical system which is suitable for manufacturing a semiconductor device and configured to expose micro patterns on a wide area.

The objective lens of the microscope disclosed in Japanese Patent Publication No. S60-034737 reduces aberrations well in the entire visible light range, but the size of the observation area is not sufficient. Moreover, the broadband microscope catadioptric imaging optical system disclosed in Japanese Domestic Publication No. 2007-514179 reduces aberrations well in a wide wavelength range and provides a high resolution, but the size of the field of view is not sufficient.

The catadioptric imaging optical system disclosed in WO00/039623 provides a high resolution over a wide range, but a wavelength region where aberrations are corrected well may not have a sufficient width. A microscope lens for enlarging a sample for observations is demanded to have a large observation region and high optical performance in a wide wavelength range.

SUMMARY OF THE INVENTION

A catadioptric optical system as one aspect of the present invention includes a first imaging optical system including a catadioptric part configured to condense a light flux from an object and to form an intermediate image of the object, and a second imaging optical system including a dioptric part configured to form an image of the intermediate image on an image surface. The first imaging optical system includes a first optical element including a light transmission part located around an optical axis, and a backside reflection part located closer to an outer circumference of the first optical element than the light transmission part of the first optical element and having a reflective surface on an object side; a second optical element including a light transmission part located around the optical axis, and a backside reflection part located closer to an outer circumference of the second optical element than the light transmission of the second optical element and having a reflective surface on an image surface side; and a negative lens located on an optical path between the first optical element and the second optical element. The first optical element and the second optical element are arranged so that the backside reflection parts face each other. The light flux from the object passes through the light transmission part of the first optical element, the negative lens, the backside reflection part of the second optical element, the negative lens, the backside reflection part of the first optical element, the negative lens, and the light transmission part of the second optical element, in this order, and is emitted to the second imaging optical system. An Abbe number of a material of the negative lens is larger than that of a material of the second optical element.

A catadioptric optical system as another aspect of the present invention includes a first imaging optical system including a catadioptric part configured to condense a light flux from an object and to form an intermediate image of the object, and a second imaging optical system including a dioptric part configured to form an image of the intermediate image on an image surface. The first imaging optical system includes a first optical element including a light transmission part located around an optical axis, and a backside reflection part located closer to an outer circumference of the first optical element than the light transmission part of the first optical element and having a reflective surface on an object side, a second optical element including a light transmission part located around the optical axis, and a backside reflection part located closer to an outer circumference of the second optical element than the light transmission of the second optical element and having a reflective surface on an image surface side, and a negative lens located on an optical path between the first optical element and the second optical element. The first optical element and the second optical element are arranged so that the backside reflection parts face each other. The light flux from the object passes through the light transmission part of the first optical element, the negative lens, the backside reflection part of the second optical element, the negative lens, the backside reflection part of the first optical element, the negative lens, and the light transmission part of the second optical element, in this order, and is emitted to the second imaging optical system.

Further features and aspects of the present invention will become apparent from the following description of exemplary embodiments with reference to the attached drawings.

DESCRIPTION OF THE PREFERRED EMBODIMENTS

Figure 1:
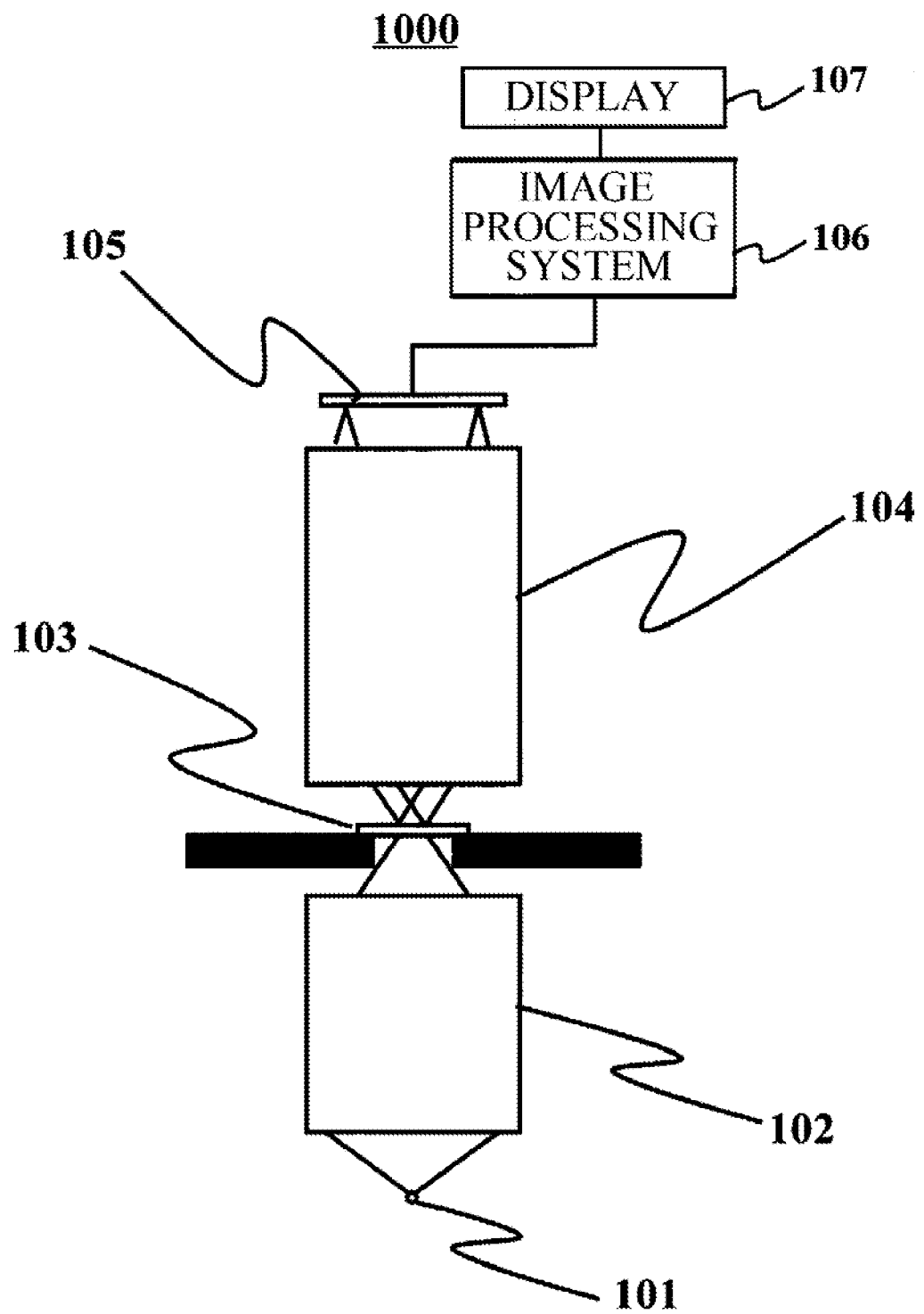
FIG. 1 is a schematic diagram of a principal part of an image-pickup apparatus in the present embodiments.

A catadioptric optical system 104 in the present invention includes a first imaging optical system G1 including a catadioptric part configured to condense a light flux from an object 103 and to form an intermediate image IM, and a second imaging optical system G2 including a dioptric part configured to form an image of the intermediate image IM on an image surface 105. An image-pickup apparatus 1000 in the present invention includes a light source unit 101, an illumination optical system 102 configured to illuminate the object 103 with a light flux from the light source unit 101, and a catadioptric optical system 104 configured to form an image of the object 103. The image-pickup apparatus 1000 further includes an image-pickup element 105 configured to photoelectrically convert an object image formed by the catadioptric optical system 104, an image processing system 106 configured to generate image information based on data from the image-pickup element 105, and a display 107 configured to display image data generated in the image processing system 106.

The first imaging optical system G1 included in the catadioptric optical system 104 of the present invention includes a first optical element M1 that has a light transmission part located around the optical axis and a backside reflection part located closer to the outer circumference of the first optical element M1 than the light transmission part and having a reflective film on an object-side surface. It further includes a second optical element M2 that has a light transmission part located around the optical axis and a backside reflection part located closer to the outer circumference of the second optical element M2 than the light transmission part and having a reflective film on an image-side surface.

The catadioptric optical system 104 further includes a negative lens L1 on an optical path between the first optical element M1 and the second optical element M2. An Abbe number of a material of the negative lens L1 is larger than that of the material of the second optical element M2.

Figure 2:
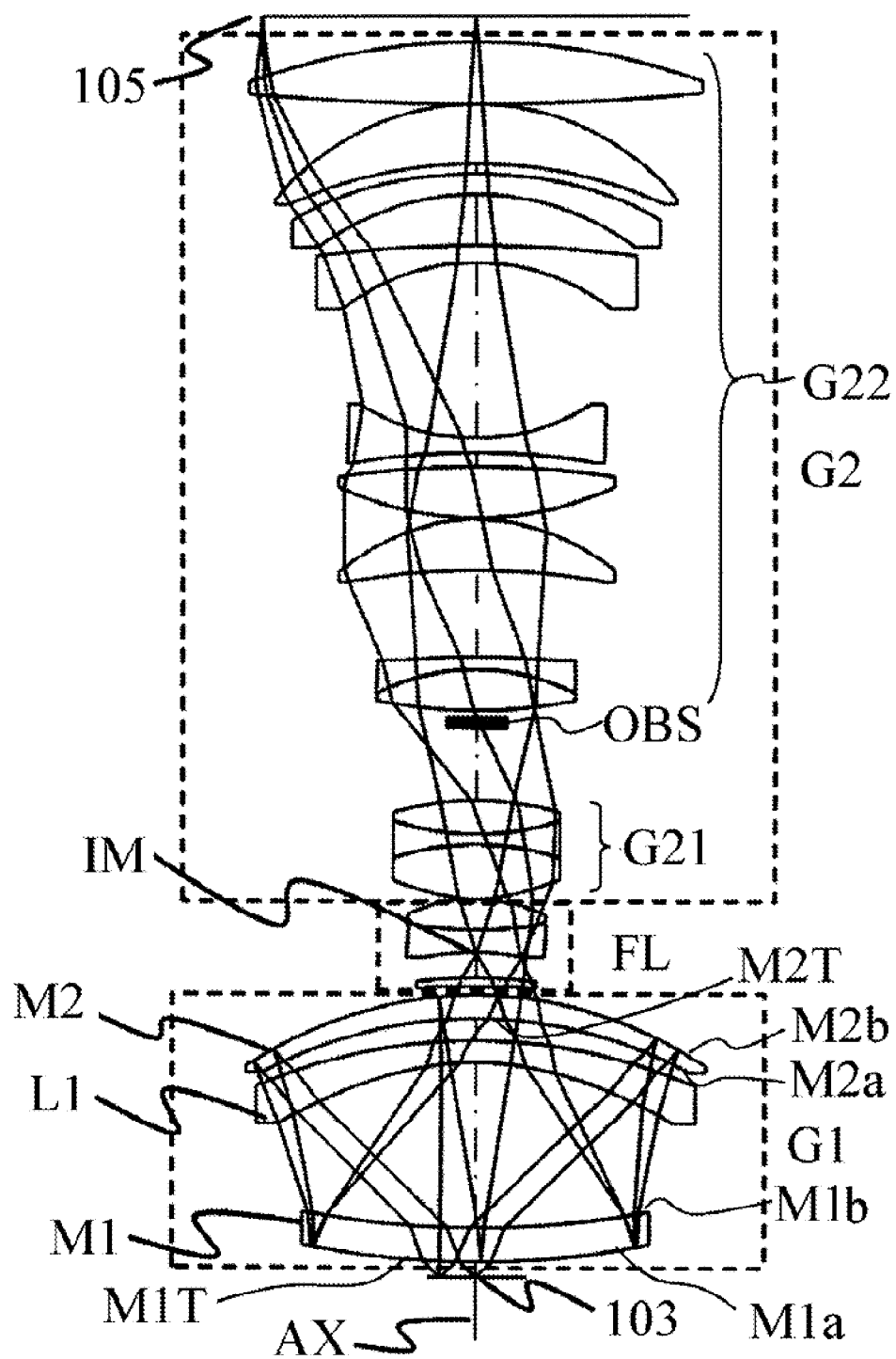
FIG. 2 is a schematic diagram of a principal part of a catadioptric optical system of embodiment 1.
Figure 3:
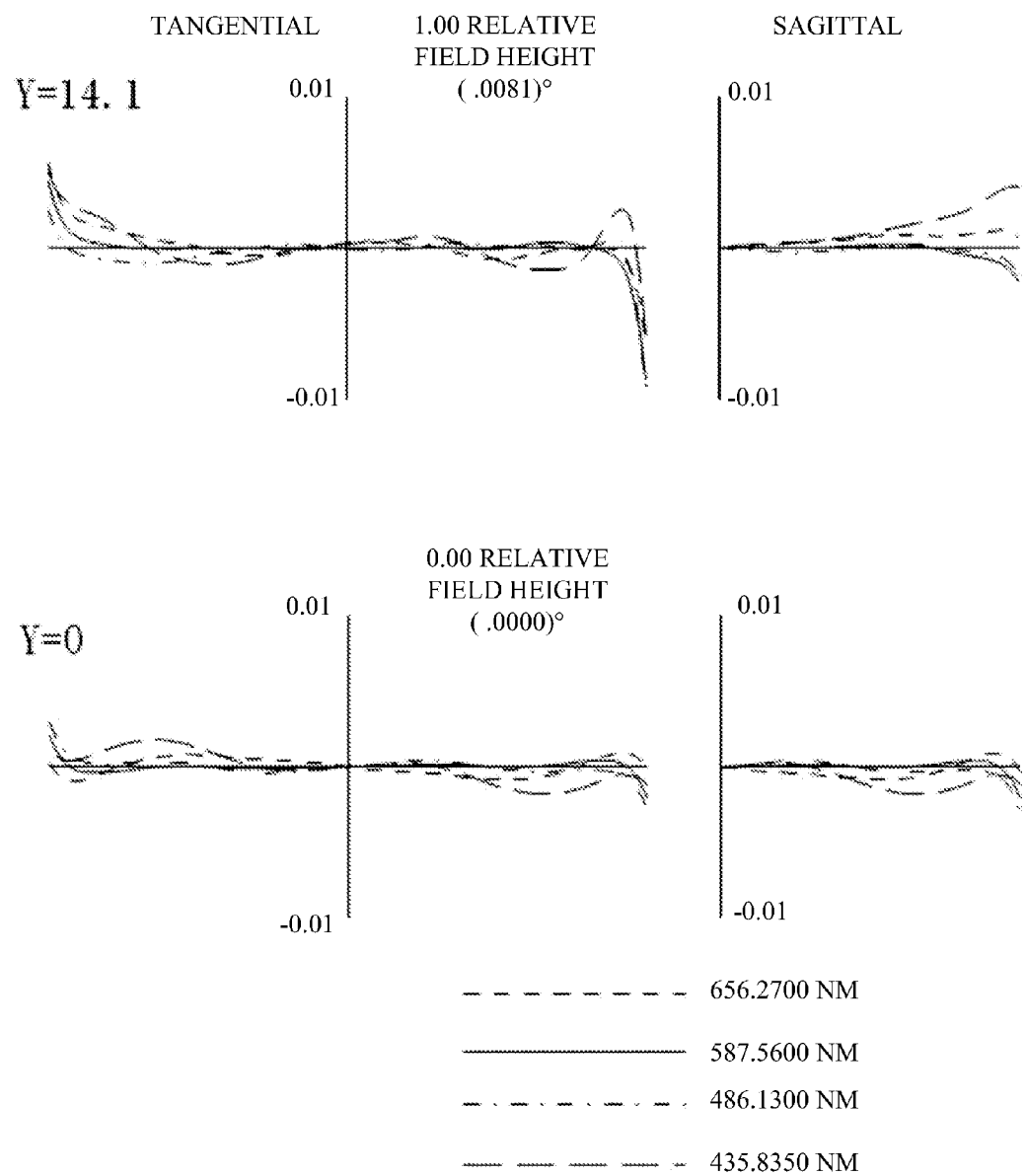
FIG. 3 is an aberration diagram of the catadioptric optical system of embodiment 1.
Figure 4:
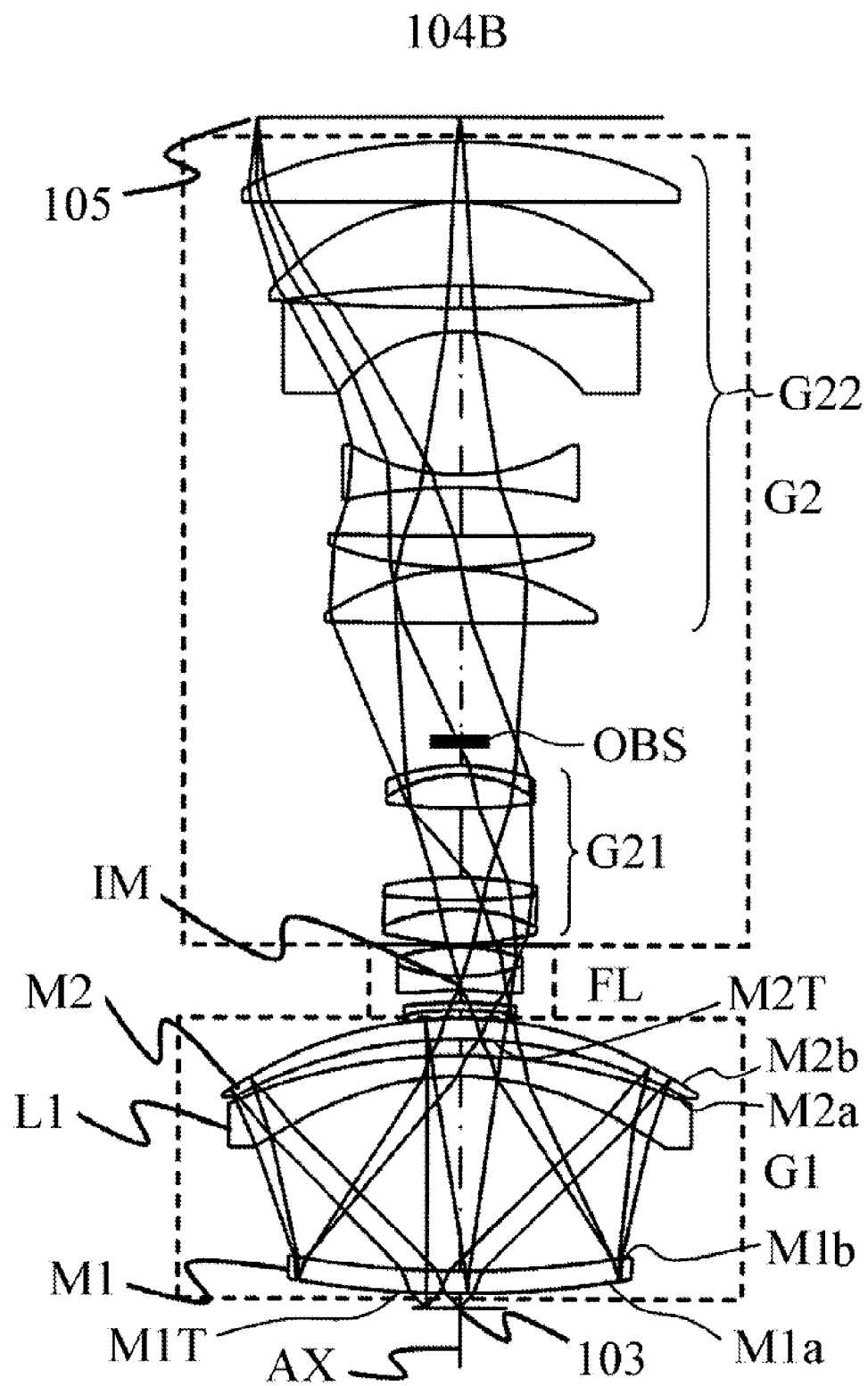
FIG. 4 is a schematic diagram of a principal part of a catadioptric optical system of embodiment 2.
Figure 5:
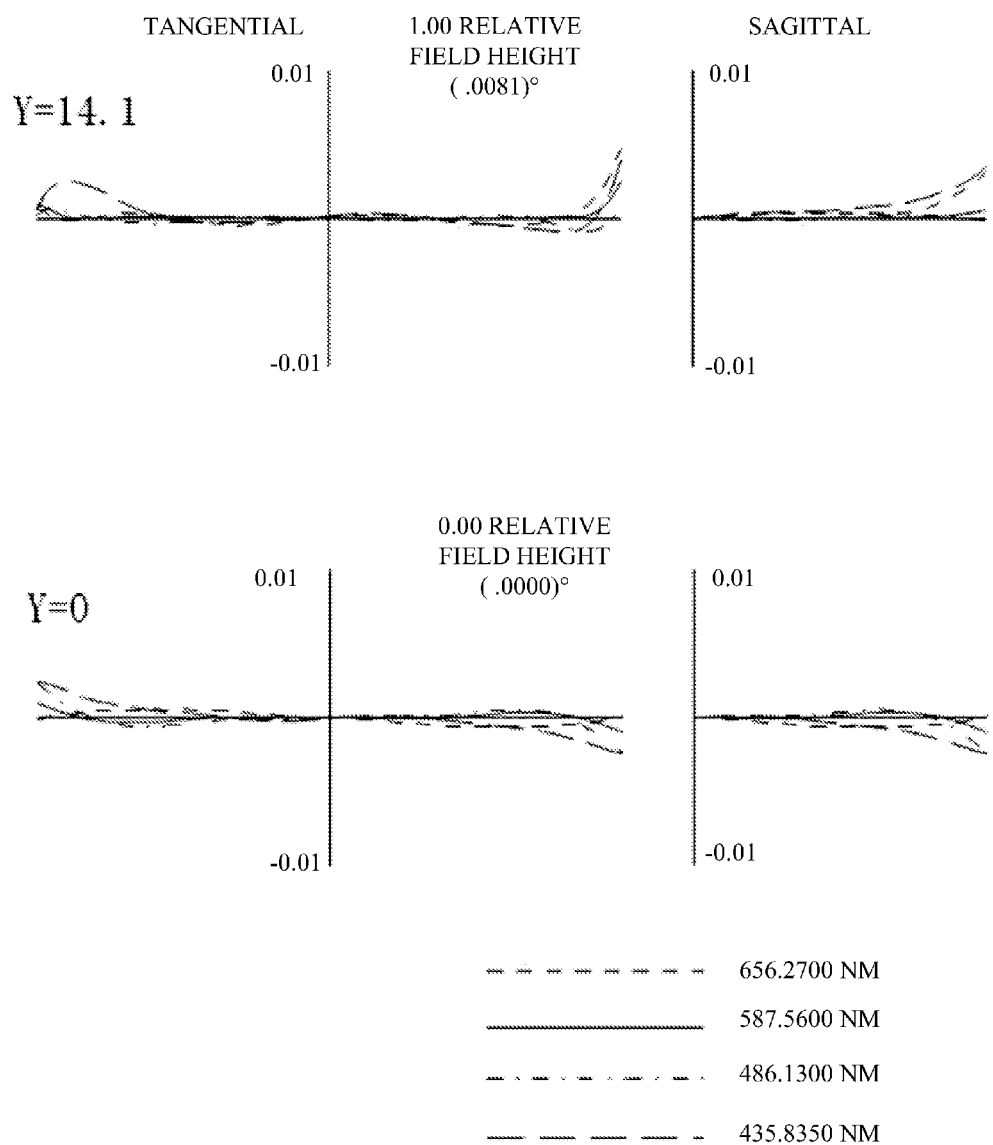
FIG. 5 is an aberration diagram of the catadioptric optical system of embodiment 2.
Figure 6:
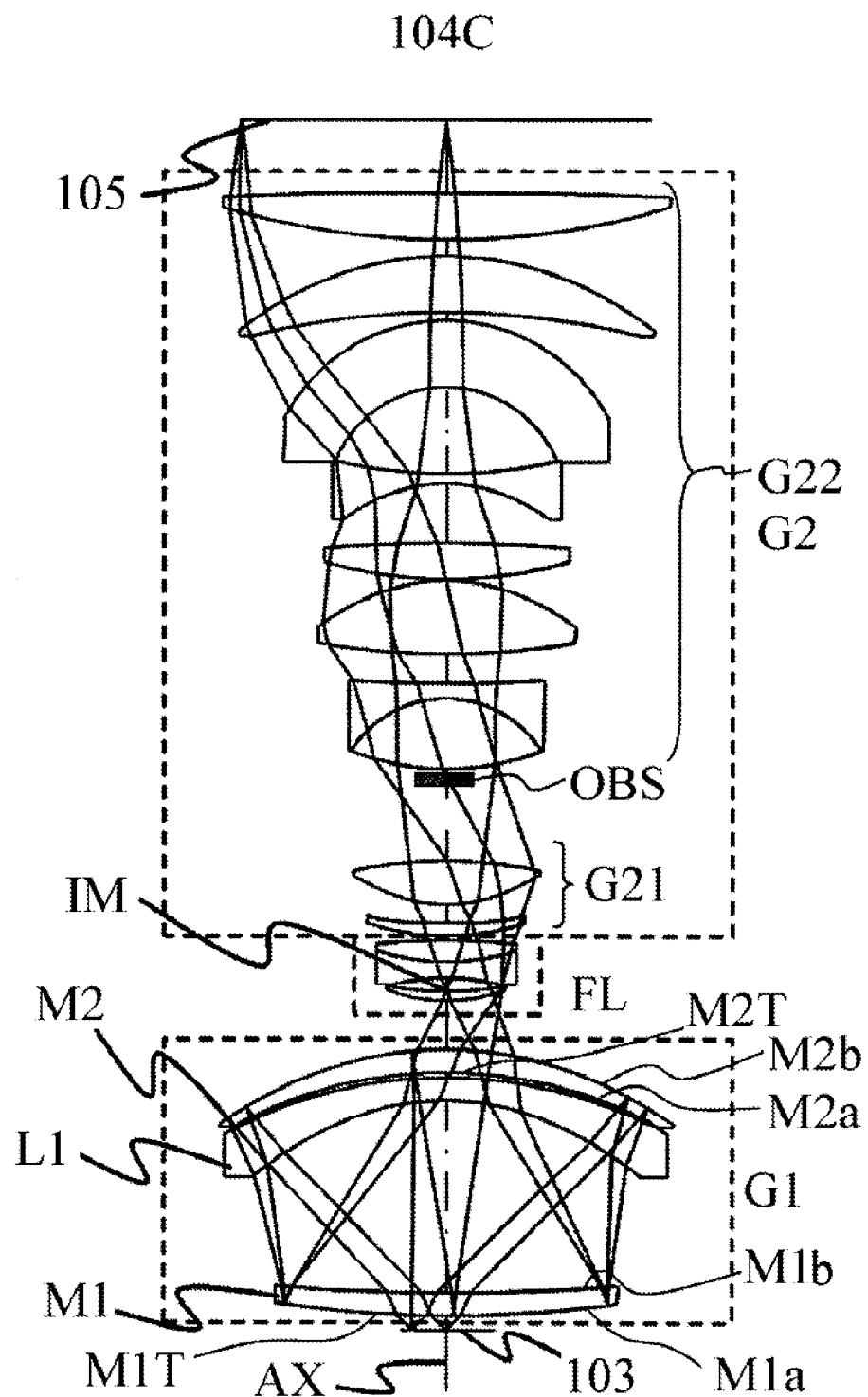
FIG. 6 is a schematic diagram of a principal part of a catadioptric optical system of embodiment 3.
Figure 7:
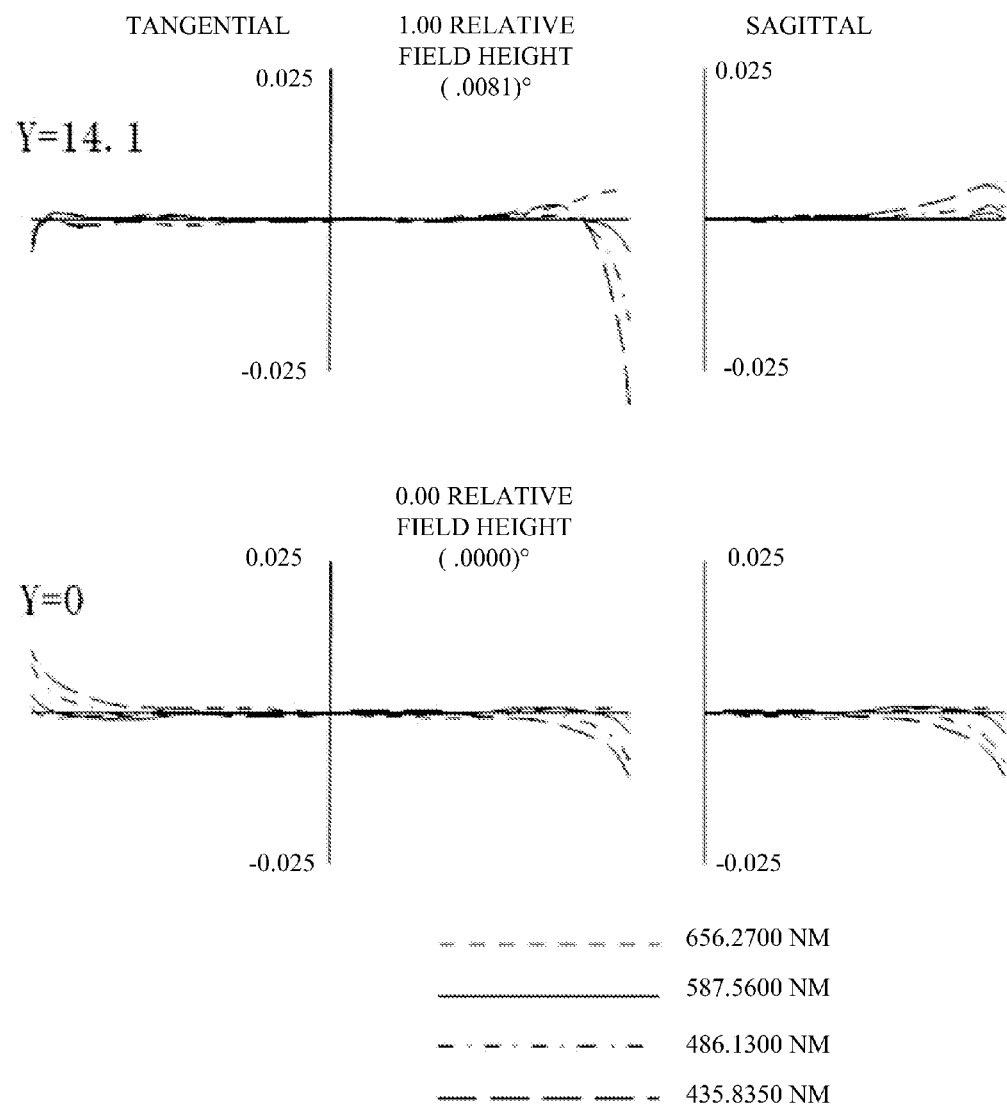
FIG. 7 is an aberration diagram of the catadioptric optical system of embodiment 3.

FIG. 1 is a schematic diagram of a principal part of an image-pickup apparatus of the present invention. FIG. 2 is a schematic diagram of a principal part of a catadioptric optical system of embodiment 1 of the present invention. FIG. 3 is an aberration diagram of the catadioptric optical system of embodiment 1 of the present invention. FIG. 4 is a schematic diagram of a principal part of a catadioptric optical system of embodiment 2 of the present invention. FIG. 5 is an aberration diagram of the catadioptric optical system of embodiment 2 of the present invention. FIG. 6 is a schematic diagram of a principal part of a catadioptric optical system of embodiment 3 of the present invention. FIG. 7 is an aberration diagram of the catadioptric optical system of embodiment 3 of the present invention.

Embodiment 1

Hereafter, a configuration of the image-pickup apparatus 1000 having the catadioptric optical system 104 of the present invention will be described with reference to FIG. 1. Here, FIG. 1 is a schematic diagram of a principal part of the image-pickup apparatus 1000 of the present invention. The image-pickup apparatus 1000 condenses light from the light source unit 101 and uniformly illuminates the sample (object) 103 using the illumination optical system 102. It uses the visible light, for example wavelengths of 400 nm-700 nm. The visible light may include a light flux within a wavelength range of 486 nm-656 nm. The catadioptric optical system 104 forms an image of the sample (object) 103 on the image-pickup element 105. Data (image information) obtained in the image-pickup element 105 is converted into image data by the image processing system 106 and the generated image data is displayed on the display 107 or the like. It further holds the generated image data in a recording medium (memory). The image processing system 106 performs a processing necessary for its application, including correcting an aberration which cannot be corrected in the catadioptric optical system 104 or synthesizing image data having different image-pickup positions into one image data.

FIG. 2 is a schematic diagram for explaining a configuration of the catadioptric optical system 104 in FIG. 1. In FIG. 2, reference numeral 104A (104B or 104C in other embodiments) denotes a catadioptric optical system, reference numeral 103 denotes an object surface on which a sample is arranged, and reference numeral 105 denotes an image surface on which the image-pickup element is arranged. AX is an optical axis of the catadioptric optical system 104A. The catadioptric optical system 104A includes the first imaging optical system G1 having reflective surfaces to condense the light flux from the object 103 and to form the intermediate image IM on a predetermined surface.

A field lens part FL is arranged in a position on which the intermediate image IM is formed. The filed lens part FL effectively introduces a light flux from the intermediate image IM to the second imaging optical system G2. The field lens part FL may be omitted. The second imaging optical system G2 is provided and includes a refractive surface, an aperture diaphragm AS, and a light shielding part OBS, and forms the image of the intermediate image IM on the image surface 105.

The first imaging optical system G1 includes a first optical element (Mangin mirror) M1, a negative lens L1, and a second optical element (Mangin mirror) M2, in order from an object side. The first optical element M1 forms a concentric shape or nearly concentric shape. An Abbe number of a material of the negative lens Ln the light transmission part M2T and having a reflection film on a surface M2b on the imag1 is larger than that of a material of the second optical element M2. The second imaging optical system G2 includes a lens unit G21, a light shielding part OBS, and a lens unit G22, in order from the object side. The aperture diaphragm is provided between the first optical element M1 and the second optical element M2 of the first imaging optical system G1 or in the second imaging optical system G2.

FIG. 2 illustrates the light flux from the object surface 103 to the image surface 105. The first optical element M1 of the first imaging optical system G1 has a convex surface M1a on the object 103 side and a concave surface M1b on the image side, and forms a light transmission part M1T located in the proximity of and around the optical axis and having a positive optical power, and a backside reflection part located closer to the outer circumference of the first optical element M1 than the light transmission part M1T and having a reflection film on the surface M1a on the object side. The surface M1a has an aspherical shape. The negative lens L1 has a meniscus shape, all surfaces thereof are formed by light transmission surfaces, and the surface on the object side has a concave aspherical shape.

The second optical element M2 has a meniscus shape where a concave surface is provided on the object side, and includes a light transmission part M2T located around the optical axis and having a positive optical power, and a back side reflection part located closer to the outer circumference of the second optical element M2 than the light transmission part M2T and having a reflection film on a surface M2b on the image side. Reference numeral M2a is a surface on the object side of the second optical element M2. The surface M2b has an aspherical shape. The first optical element M1 and the second optical element M2 are arranged so that their backside reflection parts M1a and M2b face each other. The light shielding plate OBS is configured to shield a light flux near the optical axis among the light flux from the object 103, prevents the light flux from entering the image-pickup element 105, and is arranged in the second imaging optical system G2 or at or near the aperture diaphragm.

The catadioptric optical system 104A illustrated in FIG. 2 is illuminated with a light flux from the illumination optical system 102, and a light flux emitted from the sample 103 passes through a central transmission part M1T of the first optical element M1. Then, it passes through the negative lens L1 and is diverged, and enters the refractive surface M2a of the second optical element M2. Then, it is reflected on the backside reflection part M2b and condensed, passes through the refractive surface M2a and the negative lens L1, and enters the refractive surface M1b of the first optical element M1. Then, it is reflected on the backside reflection part M1a of the first optical element M1. It passes through the refractive surface M1b, the negative lens L1, and the central transmission part M2T of the second optical element M2, and is emitted to the second imaging optical system G2. Then, it forms the intermediate image IM of the object 103 near a field lens unit FL.

In this embodiment, the intermediate image IM may be formed without the field lens unit FL. The diverging light flux from the intermediate image IM passes through the lens unit G21 having a positive optical power and the lens unit G22 having a positive optical power, and enters the image surface 105. It forms an enlarged image of the object 103 on the image surface 105. The image of the object 103 that is formed on the image-pickup element 105 is processed by the image processing system 106 and displayed on the display 107.

The characteristic of the first imaging optical system G1 according to this embodiment that forms the intermediate image IM will be described. The negative lens L1 is arranged on an optical path between the first optical element M1, which is a Mangin mirror, and the second optical element M2, which is a Mangin mirror. As a result, it becomes easy to correct a spherical aberration in the first imaging optical system G1. Here, the outer diameter (effective aperture diameter) of the first optical element M1 is defined as H1, and the effective aperture diameter of the transmission part of the first optical element M1 is defined as H2. Light from the object 103 is reflected on the surface M2b of the second optical element M2 after passing through the light transmission part M1T of the first optical element M1 and the negative lens L1.

It enters the negative lens L1 again, and a negative power of the negative lens L1 makes smaller an angle for the optical axis with respect to light flux entering the first optical element M1. As a result, the diameter H1 of the first optical element M1 get larger, thereby decreasing the ratio H2/H1 for the diameter H2 of the transmission part when it enters the first optical element M1 from the object surface 103. In other words, the deterioration of the image performance is prevented by suppressing a central obscuration ratio on the optical axis AX.

The first optical element M1 has an approximately concentric shape, thereby reducing an occurrence of a chromatic aberration and making it easy to correct a spherical aberration. Moreover, a chromatic aberration caused in the first imaging optical system G1 is reduced by making larger Abbe number of a material of the negative lens L1 between the first and second optical elements M1 and M2 than Abbe number of a material of the second optical element M2. Further, Abbe number $\nu n$ of the material of the negative lens L1 of the first imaging optical system G1 and Abbe number $\nu 2$ of the material of the second optical element M2 satisfy the following expression 1:

[EXPRESSION 1]

$$0.5 < \nu 2/\nu n < 1 \qquad (1)$$

As a result, the chromatic aberration caused in the first imaging optical system G1 gets smaller. When the lower limit or the upper limit is exceeded in expression 1, the chromatic aberration caused in the first imaging optical system G1, in particular axial chromatic aberration becomes larger, and this is undesirable because many lenses are required to cancel out the chromatic aberration by the second imaging optical system G2. In the catadioptric optical system, it is preferred that the following expression 2 is satisfied when a power of the first imaging optical system G1 is defined as $\phi 1$, and a power of the negative lens L1 is defined as $\phi n$:

[EXPRESSION 2]

$$0.10 < |n/\phi 1| < 0.30 \qquad (2)$$

As a result, the chromatic aberration caused in the first imaging optical system G1 can get smaller. When the value falls below the lower limit of the expression 2, the power of the negative lens L1 becomes too large, much aberration is caused in the negative lens L1, and it becomes difficult to correct the aberration. Moreover, in order to correct the aberration caused in the negative lens L1, it is required to become larger the power of the second optical element M2, and as a result it becomes difficult to secure the thickness at a lens edge of the second optical element M2. When the value exceeds the upper limit of the expression 2, the power of the negative lens L1 becomes too small, the central obscuration ratio H2/H1 becomes large, and the image performance deteriorates; therefore this is undesirable.

The first optical element M1 having an approximately concentric shape indicates that the following expression 3 is satisfied when a radius of curvature of each surface on the object side and the image surface side of the first optical element M1 is respectively defined as r1 and r2:

[EXPRESSION 3]

$$0.40 < r1/r2 < 1.00 \quad (3)$$

In the catadioptric optical system in this embodiment, the concave surface of the negative lens L1 is defined as the aspherical shape. As a result, it can correct the spherical aberration and the coma aberration well. In the catadioptric optical system in this embodiment, the reflective surfaces M1a and M2b of the first and second optical elements M1 and M2 are defined as the aspherical shape. As a result, it further can correct the spherical aberration and the coma aberration well. In the catadioptric optical system in this embodiment, the field of view is defined in after-mentioned numerical example so that φ (diameter) is 3 mm or more when the after-mentioned numerical example is represented in mms. If the field of view is less than that in the numerical example, the number of times of image taking increases when the entire object surface is separately taken, and a time period in the entire image taking becomes long; therefore it is undesirable.

When the field area is set to φ3 mm or more, it becomes easy to shorten the image taking time period because number of separation of the separate image taking gets less. It is further preferred that the filed area is φ10 mm or more, and it becomes easy to severely shorten the time period in the entire image taking because it becomes easy to take images of the object surface at one time.

In this embodiment, each reflector in backside surfaces of the first and second optical elements M1 and M2 has a concave shape, and each of the first and second optical elements M1 and M2 has an aspherical shape. The concave surface of the negative lens L1 also has an aspherical shape. Since three aspherical shapes are used, the chromatic aberration does not increase and the occurrence of aberrations, such as a spherical aberration and a coma aberration, can be reduced.

In the catadioptric optical system 104A of embodiment 1, the numerical aperture of the object side is 0.7, the magnification is 6 times, the object height is 14.14 mm, and the field area is φ28.28 mm. The field area exceeds φ3 mm, and further exceeds φ10 mm.

The optical system is nearly telecentric in both the object side and the image side. The wavefront aberration for white light which covers a visible wavelength range of 486 nm to 656 nm is reduced down to 50 mλrms or less.

FIG. 3 illustrates a lateral aberration in an image surface (image-pickup element surface) in embodiment 1, and both axial and off-axial aberrations are corrected well in a visible wide wavelength range. In the aberration diagram, Y denotes an image height.

The ratio ν2/νn between Abbe number νn of the material of the negative lens L1 and Abbe number ν2 of the material of the second optical element M2 is 0.60, and is within the condition expression 1.

The value of the power φn of the negative lens L1 is −0.0018, the power φ1 of the first imaging optical system G1 is 0.01181, and they are within the condition expression 2.

Embodiment 2

A catadioptric optical system of embodiment 2 in FIG. 4 will be described. In addition, undescribed parts are as well as embodiment 1. In the catadioptric optical system of embodiment 2, the numerical aperture of the object side is 0.7, the magnification is 6 times, the object height is 14.14 mm, and the field area is φ28.28 mm. The field area exceeds φ3 mm, and further exceeds φ10 mm. The optical system is nearly telecentric in both the object side and the image side. The wavefront aberration for white light which covers a visible wavelength range of 486 nm to 656 nm is reduced down to 50 mλrms or less.

FIG. 5 illustrates a lateral aberration in an image surface (image-pickup element surface) in embodiment 2, and both axial and off-axial aberrations are corrected well in a visible wide wavelength range. The ratio ν2/νn between Abbe number νn of the material of the negative lens L1 and Abbe number ν2 of the material of the second optical element M2 is 0.84, and is within the condition expression 1. The value of the power φn of the negative lens L1 is −0.0021, the power φ1 of the first imaging optical system G1 is 0.01099, and they are within the condition expression 2.

Embodiment 3

A catadioptric optical system of embodiment 3 in FIG. 6 will be described. In addition, undescribed parts are as well as embodiment 1.

In the catadioptric optical system of embodiment 3, the numerical aperture of the object side is 0.7, the magnification is 6 times, the object height is 14.14 mm, and the field area is φ28.28 mm. The field area exceeds φ3 mm, and further exceeds φ10 mm. The optical system is nearly telecentric in both the object side and the image side. The wavefront aberration for white light which covers a visible wavelength range of 486 nm to 656 nm is reduced down to 50 mλrms or less.

FIG. 7 illustrates a lateral aberration in an image surface (image-pickup element surface) in embodiment 3, and both axial and off-axial aberrations are corrected well in a visible wide wavelength range. The ratio ν2/νn between Abbe number νn of the material of the negative lens L1 and Abbe number ν2 of the material of the second optical element M2 is 0.71, and is within the condition expression 1. The value of the power φn of the negative lens L1 is −0.0027, the power φ1 of the first imaging optical system G1 is 0.011588, and they are within the condition expression 2.

As described above, each embodiment provides a catadioptric optical system that reduces aberrations in the entire visible light range with high NA, and has a wide field area, and an image-pickup apparatus having the same. While the present invention has been described with reference to exemplary embodiments, it is to be understood that the invention is not limited to these embodiments, and it can be diversely deformed and modified within the extent of gist. For example, the present invention is applicable to both an image-pickup apparatus configured to scan a large screen and an image-pickup apparatus that is not a scanner.

Hereafter, numerical examples of each embodiment will be described. A surface number denotes an order of an optical surface that transmits light, from the object surface (sample surface) to the image surface. The "r" denotes a radius of curvature of an i-th optical surface. The "d" denotes an interval between the i-th optical surface and the i+1-th optical surface. A positive sign of the "d" is set to a measurement from the object side to the image side (as the light travels) and a negative sign of the "d" is set to the opposite direction. The "Nd" and "vd" respectively denote a refraction index and an Abbe number of a material for the wavelength of 587.6 nm. The shape of an aspheric surface is represented as a general aspheric surface represented as the following formula. In the following formula, Z denotes a coordinate in the optical axis direction, c denotes a curvature (inverse of the radius of curvature r), h denotes a height from the optical axis, k denotes a conic constant, and A, B, C, D, E, F, G, H, J . . . respectively denote aspheric coefficients of the fourth order, the sixth order, the eighth order, the tenth order, the twelfth order, the fourteenth order, the sixteenth order, the eighteenth order, the twentieth order . . .

$$Z = \frac{ch^2}{1 + \sqrt{(1+k)\,c^2 h^2}} + Ah^4 + Bh^6 + Ch^8 + Dh^{10} + Eh^{12} + Fh^{14} + Gh^{16} + Hh^{18} + Jh^{20} + \ldots$$

[EXPRESSION 4]

"E-X" denotes "$10^{-x}$". Table 4 summarizes an optical constant number of each element in each embodiment and a relationship between each above-mentioned conditional expression and the following numerical examples.

Numerical Example 1

| Surface No. | r | d | Nd | vd |
|---|---|---|---|---|
| Object surface | | 6.00 | | |
| 1 | 337.13 | 13.70 | 1.8052 | 25.43 |
| 2 | 374.52 | 65.18 | | |
| 3 | −120.72 | 9.20 | 1.5237 | 60.10 |
| 4 | −213.77 | 8.82 | | |
| 5 | −174.37 | 9.49 | 1.5889 | 35.83 |
| 6 | −152.43 | −9.49 | 1.5889 | 35.83 |
| 7 | −174.37 | −8.82 | | |
| 8 | −213.77 | −9.20 | 1.5237 | 60.10 |
| 9 | −120.72 | −65.18 | | |
| 10 | 374.52 | −13.70 | 1.8052 | 25.43 |
| 11 | 337.13 | 13.70 | 1.8052 | 25.43 |
| 12 | 374.52 | 65.18 | | |
| 13 | −120.72 | 9.20 | 1.5237 | 60.10 |
| 14 | −213.77 | 8.82 | | |
| 15 | −174.37 | 9.49 | 1.5889 | 35.83 |
| 16 | −152.43 | 3.00 | | |
| 17 | 983.84 | 3.61 | 1.8040 | 46.58 |
| 18 | −206.61 | 9.98 | | |
| 19 | −87.23 | 8.91 | 1.7395 | 27.33 |
| 20 | 136.90 | 12.01 | 1.8040 | 46.58 |
| 21 | −70.30 | 0.50 | | |
| 22 | 60.02 | 21.77 | 1.8040 | 46.58 |
| 23 | −103.47 | 3.64 | 1.7346 | 27.49 |
| 24 | 106.25 | 13.87 | 1.8040 | 46.58 |
| 25 | −115.15 | 35.52 | | |
| AS | 0.00 | 0.00 | | |
| 26 | 175.99 | 16.45 | 1.8041 | 44.96 |
| 27 | −88.70 | 4.48 | 1.7208 | 27.99 |
| 28 | −423.28 | 34.79 | | |
| 29 | −291.12 | 20.41 | 1.8044 | 37.17 |
| 30 | −74.03 | 0.50 | | |
| 31 | 127.61 | 20.29 | 1.8040 | 46.58 |
| 32 | −373.57 | 5.61 | | |
| 33 | −351.62 | 6.26 | 1.7799 | 28.92 |
| 34 | 86.74 | 68.63 | | |
| 35 | −88.66 | 6.60 | 1.5934 | 35.24 |
| 36 | −554.01 | 20.77 | | |
| 37 | −103.78 | 7.72 | 1.6578 | 56.16 |
| 38 | −170.99 | 4.05 | | |
| 39 | −181.71 | 23.65 | 1.8040 | 46.58 |
| 40 | −103.36 | 0.50 | | |
| 41 | 1023.54 | 24.07 | 1.8040 | 46.58 |
| 42 | −289.07 | 10.00 | | |
| Image surface | | 0.00 | | |

TABLE 1

| Surface NO. | k | A | B | C | D |
|---|---|---|---|---|---|
| 1, 11 | 0.00E+00 | −9.89E−09 | 1.27E−13 | −7.80E−17 | 1.31E−20 |
| 3, 9, 13 | 0.00E+00 | 1.13E−07 | 3.42E−12 | 3.37E−16 | −1.64E−20 |
| 6, 16 | 3.60E−01 | 3.06E−08 | 1.10E−12 | 6.41E−17 | 9.78E−22 |
| 17 | 0.00E+00 | −1.49E−06 | −2.02E−10 | 1.78E−14 | 7.69E−16 |
| 19 | 0.00E+00 | 3.95E−06 | −5.28E−09 | 7.87E−12 | −8.77E−15 |
| 22 | 0.00E+00 | −2.82E−06 | 1.03E−09 | −1.09E−12 | 9.08E−16 |
| 28 | 0.00E+00 | 3.58E−07 | 6.24E−11 | −8.56E−14 | 8.23E−17 |
| 30 | 0.00E+00 | 2.85E−07 | 4.41E−12 | 1.17E−14 | −2.14E−18 |
| 33 | 0.00E+00 | −7.58E−10 | −1.02E−10 | 3.93E−14 | −1.53E−17 |
| 38 | 0.00E+00 | 1.17E−09 | −1.75E−11 | 1.56E−15 | 1.53E−19 |
| 42 | 0.00E+00 | −5.72E−08 | 7.68E−12 | 7.20E−16 | −4.54E−19 |

TABLE 1-continued

| Surface NO. | E | F | G | H | J |
|---|---|---|---|---|---|
| 1, 11 | −2.12E−24 | 1.95E−28 | −6.99E−33 | 0.00E+00 | 0.00E+00 |
| 3, 9, 13 | 7.19E−25 | 7.88E−29 | −1.02E−32 | 0.00E+00 | 0.00E+00 |
| 6, 16 | 1.14E−25 | 2.56E−30 | 1.33E−34 | 0.00E+00 | 0.00E+00 |
| 17 | −2.65E−18 | 2.14E−21 | 0.00E+00 | 0.00E+00 | 0.00E+00 |
| 19 | 4.76E−18 | −5.26E−29 | 0.00E+00 | 0.00E+00 | 0.00E+00 |
| 22 | −4.88E−19 | 1.31E−22 | −1.00E−26 | 0.00E+00 | 0.00E+00 |
| 28 | −5.35E−20 | 1.98E−23 | −3.14E−27 | 0.00E+00 | 0.00E+00 |
| 30 | 6.95E−22 | −1.12E−25 | 1.47E−29 | 0.00E+00 | 0.00E+00 |
| 33 | 4.61E−21 | −8.62E−25 | 7.52E−29 | 0.00E+00 | 0.00E+00 |
| 38 | −1.02E−22 | 1.38E−26 | −6.87E−31 | 0.00E+00 | 0.00E+00 |
| 42 | 7.46E−23 | −5.58E−27 | 1.61E−31 | 0.00E+00 | 0.00E+00 |

Numerical Example 2

| Surface No. | r | d | Nd | νd |
|---|---|---|---|---|
| Object surface | | 6.00 | | |
| 1 | 390.58 | 10.00 | 1.8052 | 25.43 |
| 2 | 432.37 | 81.29 | | |
| 3 | −119.76 | 9.00 | 1.5087 | 56.98 |
| 4 | −241.63 | 6.54 | | |
| 5 | −195.40 | 9.00 | 1.7726 | 48.08 |
| 6 | −163.28 | −9.00 | 1.7726 | 48.08 |
| 7 | −195.40 | −6.54 | | |
| 8 | −241.63 | −9.00 | 1.5087 | 56.98 |
| 9 | −119.76 | −81.29 | | |
| 10 | 432.37 | −10.00 | 1.8052 | 25.43 |
| 11 | 390.58 | 10.00 | 1.8052 | 25.43 |
| 12 | 432.37 | 81.29 | | |
| 13 | −119.76 | 9.00 | 1.5087 | 56.98 |
| 14 | −241.63 | 6.54 | | |
| 15 | −195.40 | 9.00 | 1.7726 | 48.08 |
| 16 | −163.28 | 3.00 | | |
| 17 | −586.62 | 4.00 | 1.8040 | 46.58 |
| 18 | −192.54 | 4.92 | | |
| 19 | −95.85 | 6.07 | 1.6264 | 32.71 |
| 20 | 80.99 | 12.20 | 1.7053 | 52.19 |
| 21 | −79.05 | 1.34 | | |
| 22 | 77.57 | 14.24 | 1.8040 | 46.58 |
| 23 | −75.54 | 4.00 | 1.5861 | 36.24 |
| 24 | 308.44 | 9.36 | 1.8040 | 46.58 |
| 25 | −158.65 | 29.41 | | |
| 26 | 260.65 | 13.44 | 1.7022 | 52.41 |
| 27 | −59.00 | 4.00 | 1.8052 | 25.43 |
| 28 | −84.22 | 8.00 | | |
| AS | 0.00 | 52.04 | | |
| 29 | 2550.04 | 22.62 | 1.7977 | 46.86 |
| 30 | −82.71 | 0.50 | | |
| 31 | 154.20 | 13.22 | 1.8043 | 38.54 |
| 32 | 1196.56 | 20.48 | | |
| 33 | −244.57 | 6.00 | 1.7170 | 28.58 |
| 34 | 94.75 | 59.28 | | |
| 35 | −65.02 | 10.00 | 1.5502 | 42.95 |
| 36 | 699.95 | 9.25 | | |
| 37 | −432.81 | 35.00 | 1.8040 | 46.58 |
| 38 | −104.32 | 0.50 | | |
| 39 | −22758.34 | 25.30 | 1.8041 | 43.70 |
| 40 | −287.63 | 10.00 | | |
| Image surface | | 0.00 | | |

TABLE 2

| Surface NO. | k | A | B | C | D |
|---|---|---|---|---|---|
| 1, 11 | 0.00E+00 | −6.82E−09 | −9.57E−14 | −1.01E−17 | 1.31E−22 |
| 3, 9, 13 | 0.00E+00 | 7.48E−08 | 4.86E−12 | 1.54E−16 | 1.79E−21 |
| 6, 16 | 3.54E−01 | 2.22E−08 | 8.79E−13 | 2.90E−17 | 9.81E−22 |
| 17 | 0.00E+00 | −3.60E−06 | −9.38E−10 | 1.40E−12 | −1.57E−15 |
| 19 | 0.00E+00 | 7.53E−06 | −4.06E−09 | 2.99E−12 | −1.77E−15 |
| 22 | 0.00E+00 | −3.34E−06 | 1.42E−09 | −1.56E−12 | 1.18E−15 |
| 28 | 0.00E+00 | 1.13E−07 | 2.12E−11 | −1.26E−16 | −4.38E−18 |
| 30 | 0.00E+00 | 2.94E−07 | 2.33E−11 | 3.36E−15 | 1.01E−19 |
| 33 | 0.00E+00 | −2.57E−09 | −3.00E−11 | 1.16E−14 | −3.85E−18 |
| 36 | 0.00E+00 | −9.41E−08 | 4.24E−12 | 1.97E−15 | −6.89E−19 |
| 40 | 0.00E+00 | −8.24E−08 | 1.57E−12 | 8.65E−16 | −2.47E−19 |

TABLE 2-continued

| Surface NO. | E | F | G | H | J |
|---|---|---|---|---|---|
| 1, 11 | −1.53E−25 | 2.39E−29 | −1.04E−33 | 0.00E+00 | 0.00E+00 |
| 3, 9, 13 | 1.27E−24 | −9.92E−29 | 3.62E−33 | 0.00E+00 | 0.00E+00 |
| 6, 16 | 7.86E−26 | −1.81E−30 | 1.52E−34 | 0.00E+00 | 0.00E+00 |
| 17 | 1.96E−18 | −2.70E−33 | −1.75E−24 | 0.00E+00 | 0.00E+00 |
| 19 | −6.32E−19 | −1.68E−34 | 1.73E−24 | 0.00E+00 | 0.00E+00 |
| 22 | −5.35E−19 | 3.14E−23 | 5.11E−26 | 0.00E+00 | 0.00E+00 |
| 28 | 6.50E−21 | 1.59E−24 | −2.42E−27 | 0.00E+00 | 0.00E+00 |
| 30 | 3.47E−23 | −1.47E−27 | 1.22E−30 | 0.00E+00 | 0.00E+00 |
| 33 | 1.13E−21 | −2.72E−25 | 3.10E−29 | 0.00E+00 | 0.00E+00 |
| 36 | 1.25E−22 | −1.25E−26 | 5.35E−31 | 0.00E+00 | 0.00E+00 |
| 40 | 2.63E−23 | −1.45E−27 | 3.39E−32 | 0.00E+00 | 0.00E+00 |

Numerical Example 3

| Surface No. | r | d | Nd | vd |
|---|---|---|---|---|
| Object surface | | 6.00 | | |
| 1 | 461.73 | 10.00 | 1.6031 | 58.77 |
| 2 | 1120.55 | 79.64 | | |
| 3 | −106.20 | 9.00 | 1.6541 | 56.52 |
| 4 | −197.77 | 2.00 | | |
| 5 | −185.42 | 9.67 | 1.8042 | 40.34 |
| 6 | −152.17 | −9.67 | 1.8042 | 40.34 |
| 7 | −185.42 | −2.00 | | |
| 8 | −197.77 | −9.00 | 1.6541 | 56.52 |
| 9 | −106.20 | −79.64 | | |
| 10 | 1120.55 | −10.00 | 1.6031 | 58.77 |
| 11 | 461.73 | 10.00 | 1.6031 | 58.77 |
| 12 | 1120.55 | 79.64 | | |
| 13 | −106.20 | 9.00 | 1.6541 | 56.52 |
| 14 | −197.77 | 2.00 | | |
| 15 | −185.42 | 9.67 | 1.8042 | 40.34 |
| 16 | −152.17 | 20.30 | | |
| 17 | 64.13 | 4.25 | 1.8040 | 46.58 |
| 18 | 189.21 | 5.05 | | |
| 19 | −83.43 | 7.00 | 1.7060 | 28.56 |
| 20 | 89.39 | 8.41 | 1.7264 | 50.74 |
| 21 | −287.04 | 1.00 | | |
| 22 | 80.68 | 1.36 | | |
| 23 | 102.32 | 5.62 | 1.8040 | 46.58 |
| 24 | 4255.70 | 7.13 | | |
| 25 | 54.32 | 18.20 | 1.8040 | 46.58 |
| 26 | −169.08 | 38.03 | | |
| AS | 0.00 | 0.00 | | |
| 27 | 112.01 | 28.58 | 1.6393 | 53.55 |
| 28 | −47.40 | 6.00 | 1.8052 | 25.43 |
| 29 | 468.82 | 12.65 | | |
| 30 | 299.80 | 30.00 | 1.8046 | 32.49 |
| 31 | −76.74 | 0.50 | | |
| 32 | 173.71 | 15.00 | 1.8043 | 37.45 |
| 33 | −786.95 | 24.66 | | |
| 34 | −62.97 | 4.00 | 1.7339 | 27.51 |
| 35 | 206.43 | 35.40 | | |
| 36 | −50.06 | 28.18 | 1.8040 | 46.58 |
| 37 | −75.07 | 3.00 | | |
| 38 | −327.29 | 23.25 | 1.8048 | 29.77 |
| 39 | −134.69 | 6.36 | | |
| 40 | 322.77 | 18.82 | 1.8052 | 25.71 |
| 41 | 19763.06 | 30.94 | | |
| Image surface | | 0.00 | | |

TABLE 3

| Surface NO. | k | A | B | C | D |
|---|---|---|---|---|---|
| 1, 11 | 0.00E+00 | −1.93E−09 | 3.10E−13 | −5.79E−18 | 1.82E−21 |
| 3, 9, 13 | 0.00E+00 | 5.86E−08 | 4.82E−12 | 6.90E−16 | −1.11E−19 |
| 6, 16 | −5.45E−02 | 1.46E−08 | 6.21E−13 | 5.96E−17 | −8.74E−21 |
| 19 | 0.00E+00 | 2.47E−06 | −8.65E−10 | 8.30E−13 | −8.02E−16 |
| 24 | 0.00E+00 | 1.96E−06 | 1.79E−10 | 7.72E−14 | −4.13E−17 |
| 25 | 0.00E+00 | −1.68E−06 | 2.39E−10 | −2.18E−13 | 6.00E−17 |
| 31 | 0.00E+00 | 1.48E−07 | 3.92E−11 | 7.68E−15 | −3.88E−19 |
| 34 | 0.00E+00 | 3.10E−07 | 1.04E−10 | 2.08E−14 | −4.65E−18 |
| 41 | 0.00E+00 | −2.40E−08 | −3.46E−13 | 1.26E−16 | −6.80E−21 |

| Surface NO. | E | F | G | H | J |
|---|---|---|---|---|---|
| 1, 11 | −8.43E−26 | −3.48E−29 | 3.00E−33 | 0.00E+00 | 0.00E+00 |
| 3, 9, 13 | 2.52E−23 | −2.18E−27 | 1.21E−31 | 0.00E+00 | 0.00E+00 |
| 6, 16 | 1.34E−24 | −8.48E−29 | 2.92E−33 | 0.00E+00 | 0.00E+00 |
| 19 | 3.30E−19 | 0.00E+00 | 0.00E+00 | 0.00E+00 | 0.00E+00 |
| 24 | 2.58E−20 | 0.00E+00 | 0.00E+00 | 0.00E+00 | 0.00E+00 |
| 25 | −1.67E−20 | 0.00E+00 | 0.00E+00 | 0.00E+00 | 0.00E+00 |
| 31 | 5.62E−23 | 0.00E+00 | 0.00E+00 | 0.00E+00 | 0.00E+00 |
| 34 | 1.54E−21 | 0.00E+00 | 0.00E+00 | 0.00E+00 | 0.00E+00 |
| 41 | 1.03E−25 | 0.00E+00 | 0.00E+00 | 0.00E+00 | 0.00E+00 |

TABLE 4

| | Embodiment | | |
|---|---|---|---|
| | 1 | 2 | 3 |
| Abbe number νn of material of negative lens L1 | 60.1 | 56.98 | 56.52 |
| Focal length of negative lens L1 | −548.227 | −478.688 | −364.813 |
| Power φn of negative lens L1 | −0.00182 | −0.00209 | −0.00274 |
| Abbe number ν2 of material of second optical element M2 | 35.83 | 48.08 | 40.34 |
| Condition expression (1) ν2/νn | 0.596173 | 0.843805 | 0.71373 |
| Focal length of first imaging optical system G1 | 84.676 | 90.963 | 86.294 |
| Power φ1 of first imaging optical system G1 | 0.01181 | 0.010993 | 0.011588 |
| R of reflective surface of second optical element M2 | −152.435 | −163.276 | −152.173 |
| Curvature of reflective surface of second optical element M2 | −0.00656 | −0.00612 | −0.00657 |
| Paraxial R of surface of object side of negative lens L1 | −120.718 | −119.758 | −106.198 |
| Paraxial curvature (c1) of surface of object side of negative lens L1 | −0.00828 | −0.00835 | −0.00942 |
| R of surface of image side of negative lens L1 | −213.766 | −241.631 | −197.766 |
| Curvature (c2) of surface of image side of negative lens L1 | −0.00468 | −0.00414 | −0.00506 |
| Condition expression (2) \|φn/φ1\| | 0.154 | 0.190 | 0.236 |
| Surface of object side of first optical element M1 | 337.13 | 390.58 | 461.73 |
| Surface of image side of first optical element M1 | 374.52 | 432.37 | 1120.55 |
| Condition expression (3) r1/r2 | 0.900 | 0.903 | 0.412 |

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2011-008370, filed on Jan. 19, 2011, which is hereby incorporated by reference herein in its entirety.

What is claimed is:

1. A catadioptric optical system comprising:
a first imaging optical system configured to condense a light flux from an object and to form an intermediate image of the object; and
a second imaging optical system configured to form an image of the intermediate image on an image surface,
wherein the first imaging optical system includes:
a first optical element including a light transmission part located around an optical axis, and a backside reflection part located closer to an outer circumference of the first optical element than the light transmission part of the first optical element and having a reflective surface on an object side;
a second optical element including a light transmission part located around the optical axis, and a backside reflection part located closer to an outer circumference of the second optical element than the light transmission part of the second optical element and having a reflective surface on an image surface side; and
a negative lens located on an optical path between the first optical element and the second optical element,
wherein the light flux from the object passes through the light transmission part of the first optical element and the negative lens, is reflected on the backside reflection part of the second optical element, passes through the negative lens, is reflected on the backside reflection part of the first optical element, and passes through the negative lens and the light transmission part of the second optical element, in this order, and is emitted to the second imaging optical system, and
wherein an Abbe number of a material of the negative lens is larger than that of a material of the second optical element.

2. The catadioptric optical system according to claim 1, wherein the following condition is satisfied when the Abbe number of the material of the negative lens is defined as νn and the Abbe number of the material of the second optical element is defined as ν2:

0.5<ν2/νn<1.0.

3. The catadioptric optical system according to claim 1, wherein the following condition is satisfied when a power of the negative lens is defined as φn and a power of the first imaging optical system is defined as φ1:

0.10<|φn/φ1|<0.30.

4. The catadioptric optical system according to claim 1, wherein the first optical element has a positive optical power around the optical axis and a meniscus shape where a surface on the object side has a convex shape,
wherein the negative lens has a meniscus shape where a surface on the object side has a concave shape, and
wherein the second optical element has a positive optical power around the optical axis and a meniscus shape where a surface on the image surface side has a convex shape.

5. The catadioptric optical system according to claim 1, wherein the following condition is satisfied when radii of curvature of a surface on the object side and a surface on the image surface side of the first optical element are respectively r1 and r2:

0.40<r1/r2<1.00.

* * * * *